United States Patent [19]

Versluys

[11] 4,401,684
[45] Aug. 30, 1983

[54] PRESERVATION OF HOPS UTILIZING ASCORBIC ACID

[75] Inventor: Jan P. Versluys, Bridport, Australia

[73] Assignee: Australian Hop Marketers Pty. Ltd., Hobart, Australia

[21] Appl. No.: 307,699

[22] Filed: Oct. 1, 1981

[51] Int. Cl.³ ............................................. C12C 3/04
[52] U.S. Cl. ............................... 426/546; 426/600; 426/640
[58] Field of Search ............... 426/600, 546, 615, 640

[56] References Cited

U.S. PATENT DOCUMENTS

| | | | |
|---|---|---|---|
| 2,159,985 | 5/1939 | Gray | 426/268 |
| 2,952,546 | 9/1960 | Fanyo | 426/546 |
| 3,318,819 | 5/1967 | Tribble et al. | 426/546 |

FOREIGN PATENT DOCUMENTS 2808981  9/1979  Fed. Rep. of Germany ...... 426/600

OTHER PUBLICATIONS

*The Brewers Digest,* "Hop Powder Pellets", Schwartz et al., Oct. 1974, pp. 46-49.

*Primary Examiner*—Raymond N. Jones
*Assistant Examiner*—Elizabeth A. Hatcher
*Attorney, Agent, or Firm*—Pollock, Vande Sande & Priddy

[57] ABSTRACT

This invention relates to a method of preserving hops from oxidation. Hops are often required to be stored for long periods and are therefore subject to deterioration due to oxidation. The method of this invention overcomes this problem by adding ascorbic acid to the hops. The ascorbic acid is oxidized in preference to the hops and therefore prevents the hops from being oxidized.

The introduction of ascorbic acid powder during the hops pelletizing process and immediately after the hammermilling steps also prevents the loss of valuable hop constituents which naturally occurs during the pelletizing process.

7 Claims, No Drawings

PRESERVATION OF HOPS UTILIZING ASCORBIC ACID

This invention relates to the preservation of hops.

As is well known hops are a primary ingredient in the manufacture of beer. After the hops are harvested the hops may be stored for some time before being used in the manufacture of beer.

The resin complex of hops consists of humulones (alpha-acids), lupulones (beta-acids), uncharacterised soft resins and 'hard resins' (oxidation products of alpha- and beta-acids).

During copper-boiling in the brewery, the water-insoluble humulones are converted into soluble isohumulones. The isohumulone content of beer very largely determines its level of bitterness.

Alpha-acids are subject to deterioration by oxidation during hop storage, and part of the alpha-acids complex is then converted into hard resins. The speed and ultimate extend of this conversion are dependent on duration of storage and on storage temperature.

In the past hops have been pelletized and the pelleting of hops, where the end-product is packaged under vacuum in pellet bags formed of oxygen-barrier materials, slows down the rate of deterioration very markedly. However, traces of oxygen remain after evacuation and sealing of the pellet bags, and the residual oxygen is capable of causing some further product deterioration, (e.g. at ambient temperature, a relative loss of alpha-acids of 0.3% per week in pellets, against 1–2% per week in baled hops).

The present invention seeks to provide a method whereby hop deterioration at least by oxidation is reduced and preferably substantially eliminated.

The invention provides a method of preventing deterioration of hops, said method including the step of adding ascorbic acid to the hops.

The present invention provides a method of preventing the deterioration of hops by oxidation, said method including the step of adding an antioxidant material to said hops, said antioxidant material being ascorbic acid (vitamin C).

We have found that when a sufficient amount of ascorbic acid is added to the hops the ascorbic acid is being oxidized preferentially and therefore prevents the hops oxidizing. We have also found that the addition of ascorbic acid to the hops has no detrimental effect on beer produced from the hops because residual ascorbic acid in the hop material is completely dissociated during copper boiling.

Preferably the said antioxidant is added to hop powder prior to pelleting. Preferably, ascorbic acid in powder form is introduced between the hammermill and the hop powder storage/mixing tank. Said introduction relies on the venturi-effect of the hop powder-carrying airstream from hammermill into hop powder storage/mixing tank.

The rate of introduction of ascorbic acid may be calibrated against the known input of dried hops into the hammermill, so as to give to the resultant hop powder any desired concentration of ascorbic acid.

Preferably the method further includes the steps of pelleting the hops to form hop pellets having said antioxidant therein and packing the hop pellets under vacuum in packages formed of oxygen barrier material.

Any oxygen which remains in the packages after the vacuum packing will oxidize the said antioxidant in preference to the hop pellets.

In one preferred embodiment the addition of 0.4 Kg. ascorbic acid (at a cost of $4) per 1 ton of hop powder prior to pelleting completely halted alpha deterioration in pellets kept at room temperature for 5 months. At 30° C., the rate of alpha-deterioration was slowed down progressively with increasing quantities of added ascorbic acid, to a point where the deterioration at a dosage rate of 4 Kg/ton was 5 times slower than in untreated material.

The introduction of ascorbic acid powder immediately after the hammermilling stage also completely prevented the loss of alpha-acids which occurs during the pelletizing process. Normally, the relative loss of alpha-acids through oxidation during pelleting is of the order of 4–8%.

I claim:

1. A method of preventing the deterioration of hops, said method characterized by the step of adding ascorbic acid to the hops, said acid being in an amount sufficient to prevent deterioration of hops by oxidation.

2. A method according to claim 1 further including the step of packing the hop pellets under vacuum in packages formed of oxygen barrier material.

3. A method of preventing the deterioration of hops comprising the steps of adding ascorbic acid to hop powder and forming pellets from the resulting mixture of hop powder and ascorbic acid, said acid being in an amount sufficient to prevent deterioration of the hops by oxidation.

4. A method according to claims 1 or 3 wherein the ascorbic acid is introduced into the hops between a hammermill and a hop powder storage/mixing tank, said ascorbic acid being drawn into a hop powder carrying airstream by reduced pressure of a venturi-effect caused by the hop powder carrying airstream.

5. A method according to claims 1, 2 or 3 wherein said ascorbic acid is present in said hops in an amount from about 0.4 Kg per ton to about 4 Kg per ton.

6. A method according to claim 4 wherein said ascorbic acid is present in said hops in an amount from about 0.4 Kg per ton to about 4 Kg per ton.

7. Hop pellets containing ascorbic acid in a concentration of from 0.4 Kg per ton to about 4 Kg per ton.

* * * * *